US008299360B2

(12) United States Patent
Sato et al.

(10) Patent No.: US 8,299,360 B2
(45) Date of Patent: Oct. 30, 2012

(54) BUSBAR AND ELECTRICAL JUNCTION BOX INCORPORATING THE SAME

(75) Inventors: Hisashi Sato, Shizuoka (JP); Takahiro Mochizuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 234 days.

(21) Appl. No.: 12/923,613

(22) Filed: Sep. 29, 2010

(65) Prior Publication Data

US 2011/0073345 A1 Mar. 31, 2011

(30) Foreign Application Priority Data

Sep. 30, 2009 (JP) ................................ 2009-226017

(51) Int. Cl.
*H02G 5/00* (2006.01)

(52) U.S. Cl. ...... 174/68.2; 174/50; 174/70 B; 174/72 B; 174/88 B; 361/611; 361/637

(58) Field of Classification Search .................... 174/50, 174/88 B, 72 B, 71 B, 70 B, 99 B, 149 B, 174/133 B, 137 B, 68.2; 439/212, 213, 114; 361/675, 715, 306.1, 306.3, 600, 611, 637, 361/638, 639, 648, 601
See application file for complete search history.

(56) References Cited

U.S. PATENT DOCUMENTS

| | | | | |
|---|---|---|---|---|
| 6,325,640 | B1 * | 12/2001 | Kasai .......................... | 174/71 B |
| 6,674,006 | B1 * | 1/2004 | Linehan et al. ............. | 174/72 B |
| 6,888,066 | B1 * | 5/2005 | Wiant et al. ................. | 174/70 B |
| 7,563,982 | B2 * | 7/2009 | Kimmel ....................... | 174/72 B |
| 7,830,648 | B2 * | 11/2010 | Strong et al. ................ | 174/71 B |

FOREIGN PATENT DOCUMENTS

JP 2009-077485 A 4/2009

* cited by examiner

*Primary Examiner* — Angel R Estrada
(74) *Attorney, Agent, or Firm* — Edwards Wildman Palmer LLP

(57) ABSTRACT

A busbar includes a first busbar component as a busbar body and a second busbar component connected thereto. The first busbar component is made of an electrically-conductive metal material having superior spring property. The first busbar component includes a male-terminal-connecting portion for clamping a male terminal of a device and a power input part provided upstream of the male-terminal-connecting portion. The second busbar component is made of an electrically-conductive metal material having electrical conductivity superior to that of the first busbar component. The second busbar component is connected to the first busbar component via a first section of the second busbar component in register with the power input part of the first busbar component and a second section of the second busbar component in register with a portion of the first busbar component, the portion being upstream of the male-terminal-connecting portion at which the current is divided.

4 Claims, 6 Drawing Sheets

BUSBAR AND ELECTRICAL JUNCTION BOX INCORPORATING THE SAME

CROSS REFERENCE TO RELATED APPLICATION

This application claims priority to Japanese Patent Application No. 2009-226017 filed on Sep. 30, 2009, the contents of which are fully incorporated herein by reference.

BACKGROUND OF THE INVENTION

1. Field of the Invention

The present invention relates to a busbar through which a large current flows, the busbar including male-terminal-connecting portion having spring property, and to an electrical junction box incorporating this busbar.

2. Description of the Related Art

An electrical junction box, e.g., a relay box (R/B) mounted in an automobile or other vehicles comprises a busbar that includes male-terminal-connecting portions for connecting male tab terminals (male terminals) of a miniature fuse and a blade-type fuse to the busbar.

The male-terminal-connecting portion has a tuning-fork-like shape for clamping the male tab terminal to provide electrical connection.

The busbar is made of an electrically-conductive metal material having superior spring property (an electrically-conductive metal material having superior mechanical property) so that the male tab terminal is clamped by the male-terminal-connecting portion and electrically connected thereto.

The electrically-conductive metal material is copper alloy having the spring property so that the busbar ensures reliable electrical connection.

However, since the copper alloy is made of copper as the principal component and other metal or non-metal material, its electric conductivity is inferior to that of pure copper. Accordingly, in order that the large current is allowed to flow in the busbar, a cross section of the busbar has to be enlarged. This means that the busbar has relatively large dimensions.

Such a conventional busbar having relatively large dimensions may not be compatible with high yield ratio and mountability, i.e., the degree of how the busbar can be readily mounted to the electrical junction box.

In addition, a busbar made of pure copper in view of improved electric conductivity may fail to have sufficient spring property, and such insufficient spring property makes it difficult for the male-terminal-connecting portion to ensure reliable connection.

Japanese Patent Application Laid-Open Publication No. 2009-77485 discloses a busbar that addresses the above-identified drawbacks found in the conventional products.

As shown in FIG. 6, a busbar 1 comprises a first busbar component 2, a second busbar component 4, and a plurality of male-terminal-connecting portions 3 provided in the second busbar component 4. The first busbar component 2 is made of electrically-conductive metal material having superior electrical conductivity and serves as the busbar body. The second busbar component 4 is made of an electrically-conductive metal material having superior mechanical property and connected by welding to a predetermined portion of the first busbar component 2 as the busbar body.

The second busbar component 4 includes (i) a section dedicated to connecting a male tab terminal to the second busbar component 4, i.e., a male-terminal-connecting portion 3, and (ii) a portion 5 for welding of the second busbar component 4 to the first busbar component 2. This configuration allows the busbar 1 to increase the electric conductivity of the first busbar component 2 serving as the busbar body when compared with a conventional busbar, and thereby the dimensions can be reduced and at the same time reliable connection of the second busbar component 4 can be maintained in a sufficient level as in the conventional one. The busbar 1 improves its yield ratio and mountability with respect to the electrical junction box.

Although the busbar 1 disclosed in the patent literature PTL 1 is advantageous in the above aspects, improvement of the following aspects will make the busbar more advantageous. Specifically, since relatively large force acts upon the male-terminal-connecting portion 3 when the male tab terminal is inserted thereinto and detached therefrom, breakage or detachment of the second busbar component 4 from the first busbar component 2 may result if the connection (joining) provided at a portion b below the male-terminal-connecting portion 3 is incomplete or insufficient.

Also, when the accuracy of the connection (joining) between the first and second busbar components 2, 4 is not increased, the second busbar component 4 may be deviated from its intended position with respect to the male tab terminal to be connected thereto, and also may be deviated from its intended position with respect to the electrical junction box to which the second busbar component 4 is to be connected.

Also, it is more preferable to reduce the dimensions of the busbar 1 while ensuring that the large current can flow in the busbar 1.

SUMMARY OF THE INVENTION

In view of the above-identified drawbacks, an object of the present invention is to provide a busbar that ensures improves reliable connection and capable of allowing a large current to flow therein even when dimensions of the busbar are reduced.

Another object of the present invention is to provide an electrical junction box incorporating this busbar.

In order to attain the above objective, a busbar according to a first aspect of the present invention comprises a first busbar portion, a second busbar portion, and at least one male-terminal-connecting portion provided in the first busbar component.

The first busbar component serves as a busbar body and is made of an electrically-conductive metal material having good spring property. The first busbar component includes the at least one male-terminal-connecting portion adapted to clamp a male terminal of a device connected to the first busbar component and a power input part provided upstream of the male-terminal-connecting portion.

The second busbar component is made of an electrically-conductive metal material having electrical conductivity superior to that of the first busbar component. The second busbar component is connected to the first busbar component via a first section of the second busbar component in register with the power input part of the first busbar component and a second section of the second busbar component in register with a portion of the first busbar component, the portion of the first busbar component being upstream of the male-terminal-connecting portion. The current flowing in the first busbar component is divided at this portion of the first busbar component.

According to the present invention with the above features, the male-terminal-connecting portion is provided not in the second busbar component but in the first busbar component as the busbar body. Accordingly, the male-terminal-connecting portion can be stably positioned, and force acting upon the male-terminal-connecting portion does not affect the connecting or joining portion between the first busbar component and the second busbar component.

In the present invention, even when the dimensions of the first busbar component is reduced, a large current can flow in the busbar with the second busbar component made of the electrically-conductive metal material having the superior electrical conductivity joined with the first busbar component. These two busbar components ensure a level of resistance for allowing the large current to flow.

Preferably, the second busbar component is connected to the first busbar component by welding, the welding being made at the first section and the second section.

According to the present invention with the preferable feature, the first busbar component and the second busbar component are connected in parallel with each other (which will be described in detail in the exemplary embodiment) so as to reduce the resistance between the welding portions to allow larger current to flow.

According to another aspect of the present invention, there is provided an electrical junction box that includes the above-described busbar and a cavity having an insertion slot into which the busbar is inserted.

According to the present invention with the above feature, the electrical junction box includes the busbar having reduced dimensions. Accordingly, it is made possible to provide an electrical junction box with the height of the cavity wall reduced. By making the height of the cavity wall smaller, the cavity wall does not interfere with mounting operation of the junction box, making it easier to attach the terminal fittings thereto.

Further, since the present invention includes the busbar whose male-terminal-connecting portion is stably positioned, it is possible to prevent positional deviation of the male-terminal-connecting portion with respect to mounting to the cavity and the connection with the male terminal of a mating component.

BRIEF DESCRIPTION OF THE DRAWINGS

The above and other aspects, features and advantages of the present invention will be more apparent upon reading of the following more particular description thereof in conjunction with the following drawings wherein.

DESCRIPTION OF EXEMPLARY EMBODIMENT

Although the following description contains specific implementation details for the purposes of illustration, those skilled in the art will appreciate that various variations and alterations to the following details fall within the scope of the present invention. Accordingly, the following exemplary embodiment of the invention is set forth without imposing limitations upon the claimed invention.

Figure 1:
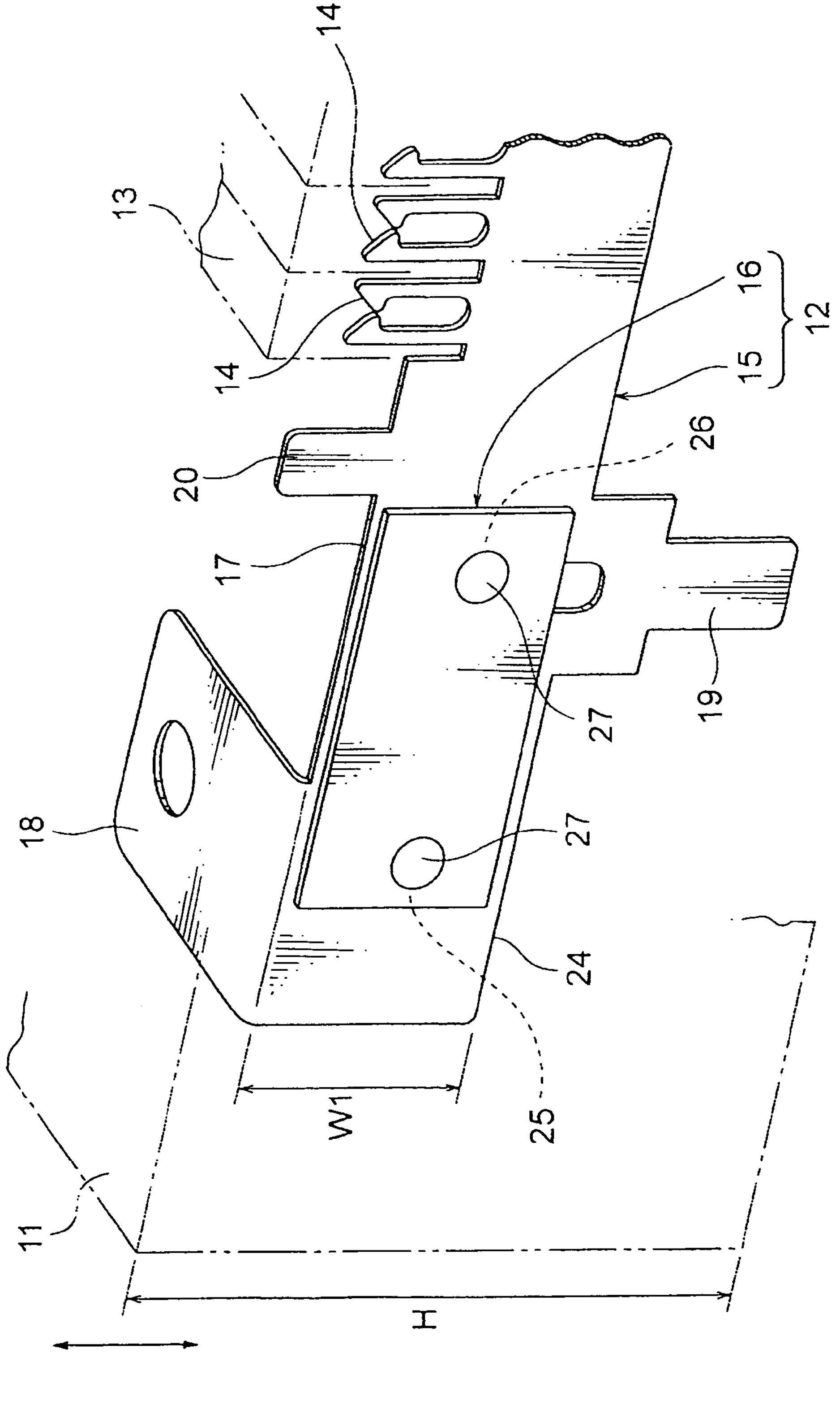
FIG. 1 is a perspective view of a busbar according to one embodiment of the present invention and an electrical junction box to which the busbar is mounted.

Referring to FIG. 1, there is shown a perspective view of a busbar 12 according to the exemplary embodiment of the present invention and an electrical junction box incorporating the sane busbar 12.

First, the configuration of the electrical junction box is described in detail with reference to FIG. 1, which schematically illustrates a junction box body 11 of the electrical junction box.

The electrical junction box may be a relay box (R/B) mounted in an engine room of an automobile and comprise the junction box body 11, an upper cover (not shown) adapted to be brought into engagement with an upper portion of the junction box body 11, and a lower cover (not shown) adapted to be brought into engagement with a lower portion of the junction box body 11.

The junction box body 11 is constructed to mount therein the busbar 12 vertically from below. Specifically, the junction box body 11 includes an insertion slot (not shown) opening at a bottom surface thereof, the opening being constructed to insert the busbar 12 therein. The insertion slot communicates with part of a fuse cavity 13. Also, terminal fittings are inserted vertically from below into a not-shown cavity adjacent to the fuse cavity 13.

The fuse cavity 13 is constructed to accommodate therein a male-terminal-connecting portion 14 (which will be later described) provided in the busbar 12. The fuse cavity 13 may be adapted to insert and accommodate therein a not-shown miniature fuse and a blade-type fuse.

A height H in a vertical direction of the junction box body 11 is reduced relative to that of a conventional junction box. Reduction in the height H of the junction box body 11 and a cavity wall of the fuse cavity 13 allows intervening portions in the height H direction to be eliminated, so that the not-shown terminal fittings can be inserted therein more effectively. The reduced height H of the junction box body 11 is one of the features of the busbar 12 of this embodiment.

Next, the configuration of the busbar 12 according to one embodiment of the present invention is described.

The busbar 12 is a circuit (busbar circuit) formed according to a predetermined pattern, and a large current is allowed to flow in a predetermined portion of the busbar 12.

The busbar 12 of this embodiment comprises (A) a first busbar component 15, (B) a second busbar component 16 connected to a portion of the first busbar component 15 where a large current has to flow, and (C) one or more male-terminal-connecting portion 14 adapted to clamp a male tab terminal (male terminal) of a not-shown mating component.

The first busbar component 15 is a member serving as a main body of the busbar 12 (i.e., a busbar body) and made of an electrically-conductive metal material having superior spring property (electrically-conductive metal material having superior mechanical property).

The first busbar component 15 includes at least one male-terminal-connecting portion 14 adapted to clamp the male terminal of the not-shown mating component such as a miniature fuse and a blade-type fuse.

The male-terminal-connecting portion 14 is a portion for clamping the male tab terminal and keeping it in a connected state, and accordingly in view of sufficient level of reliable connection, the spring property of the male-terminal-connecting portion 14 is a prerequisite. Accordingly, the first busbar component 15 needs to have the spring property due to the existence of the male-terminal-connecting portions 14 provided in one piece with the first busbar component 15. The electrically-conductive metal material having the superior spring property may be copper alloy in this embodiment.

The male-terminal-connecting portions 14 take a shape of a tuning-fork terminal. The male-terminal-connecting portions 14 are arranged at an upper section 17 of the first busbar component 15 lengthwise of the first busbar component at regular pitches (the number and arrangement of the male-terminal-connecting portions 14 are described by way of illustration and not limitation). Since the male-terminal-connecting portions 14 are provided on the first busbar component 15 serving as the busbar body, the male-terminal-connecting portions 14 can be stably positioned, and even when force acts upon the male-terminal-connecting portions 14 from the male tab terminals of the not-shown miniature fuse and the blade-type fuse, the positioning of the male-terminal-connecting portion 14 are not affected, which differs from a case of a conventional busbar.

Figure 4:
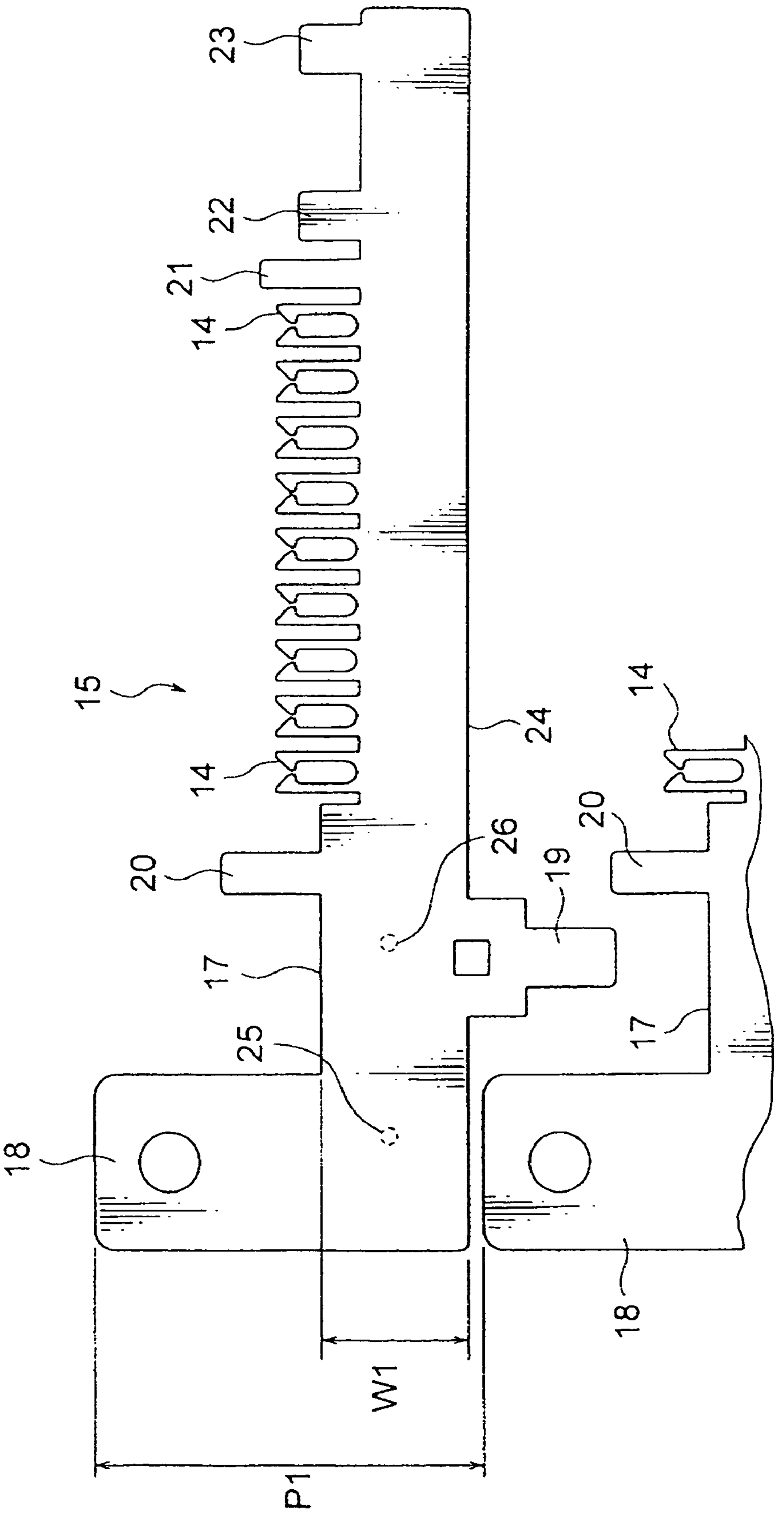
FIG. 4 illustrates a state of blank of a first busbar component of the busbar of FIG. 1.

In addition to the male-terminal-connecting portions 14, the first busbar component 15 may include a power input part 18 and tabs 19 to 23 (see FIG. 4).

The power input part 18 has the illustrated shape and is configured to connect a cable to the first busbar component 15, the cable being connected to a not-shown battery.

The power input part 18 is electrically the most upstream in the first busbar component 15 (or busbar 12) of this embodiment.

The tab 19 is provided between the power input part 18 and the male-terminal-connecting portions 14 (upstream of the male-terminal-connecting portions 14). The tab 19 is a relatively large tab when compared with the remaining tabs, and continues to a lower section 24 of the first busbar component 15.

The tab 20 continues to the upper section 17 of the first busbar component 15 so as to be proximate to the male-terminal-connecting portion 14.

The tabs 21 to 23 (see FIG. 4) are provided downstream of the male-terminal-connecting portions 14. The current (from a power source) flowing via the power input part 18 are divided at a point corresponding to the tab 19 into two flows, one flowing in the tab 19 and the other in a portion downstream of the tab 19 (the current flow will be later described).

The tabs 20 and 21 are protective pieces for guiding the busbar 12 to be mounted to the junction box body 11 and protecting the male-terminal-connecting portion 14.

The second busbar component 16 is a member connected to a portion of the first busbar component 15 via (i) a first section 25 in register with (or corresponding to) the power input part 18 of the first busbar component 15 and (ii) a second section 26 in register with (or corresponding to) a portion of the first busbar component 15, the portion being upstream of the male-terminal-connecting portion 14, at which the current flowing in the first busbar component 15 is divided (in this embodiment, the second section of the second busbar component 16 is in register with the tab 19 of the first busbar component 15 at which the current is divided).

The second busbar component 16 is made of an electrically-conductive metal material having electrical conductivity superior to that of the first busbar component 15. The electrically-conductive metal material having the superior electrical conductivity may be pure copper in this embodiment.

The second busbar component 16 has a shape of a substantially rectangular plate. A width of the second busbar component 16 is slightly smaller than a busbar width between the upper section 17 and the lower section 24 of the first busbar component 15 (however, the width of the second busbar component 16 may be the same as the busbar width W1 of the first busbar component 15).

The second busbar component 16 may have a thickness different from that of the first busbar component 15. Also, a plurality of the second busbar component s 16 may be provided in a piled state and connected to the first busbar component 15. The thickness of the second busbar component 16 is defined such that the necessary current is allowed to flow in the first busbar component 15 with the busbar width W1 having the electric conductivity inferior to that of the second busbar component 16.

With regard to joining (connection) of the second busbar component 16 to the first busbar component 15, spot welding is preferable (but not limited thereto). The second busbar component 16 may be welded not by spots but in lines. Also, instead of welding, joining by engagement structure is also contemplated.

Weld portions 27 are illustrated in FIG. 1. The weld portions 27 are provided at the first section 25 and the second section 26, respectively (at least two weld portions 27 has to be provided at this two sections).

Figure 2:
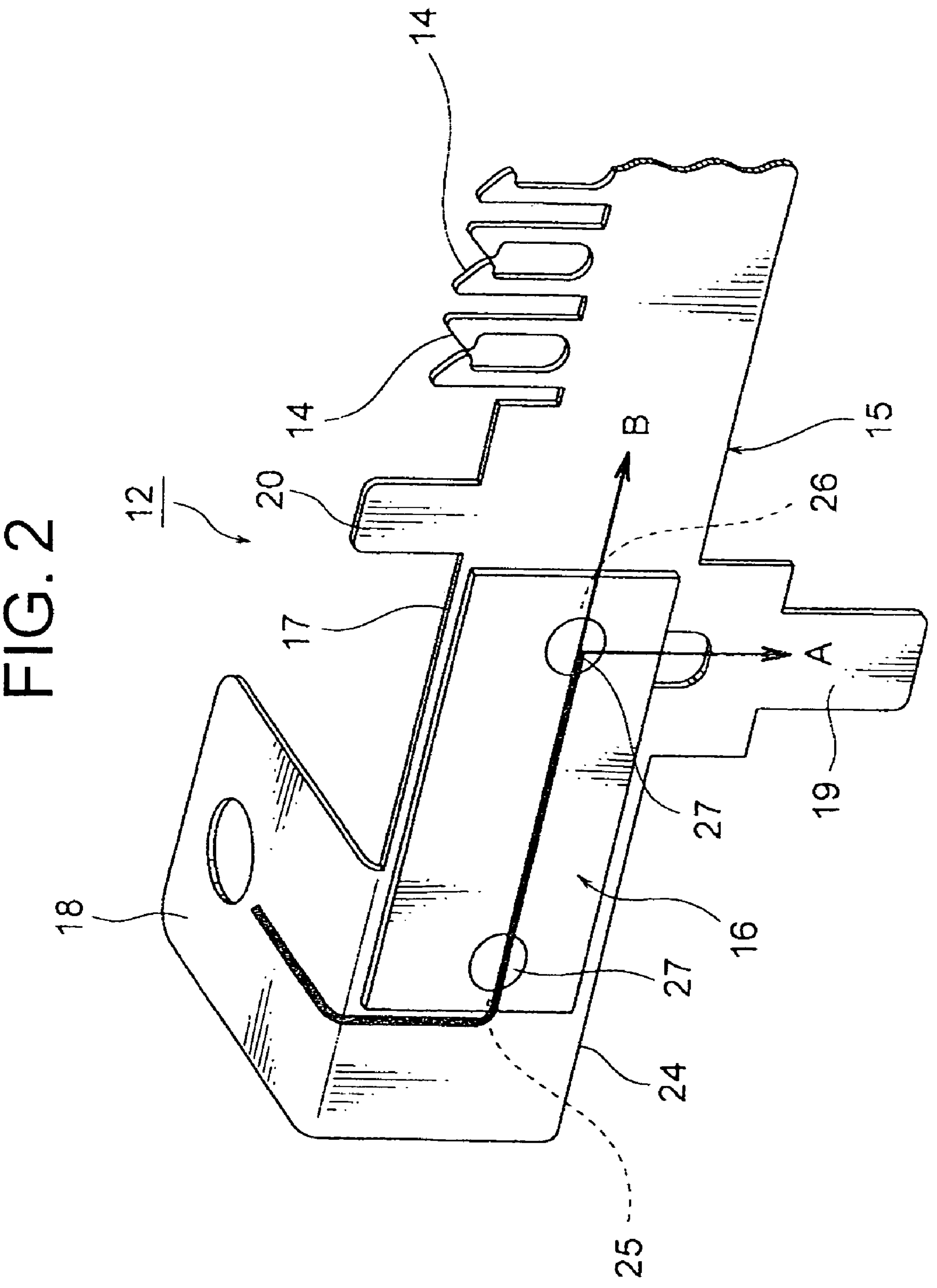
FIG. 2 is a schematic representation of current flow in the busbar of FIG. 1.

The busbar 12 having the above-described configuration includes the second busbar component 16 connected to the first busbar component 15 at a predetermined portion thereof. Accordingly, the large current can flow in the portion of connection between the two busbar components 15, 16. The large current (i.e., a current A plus a current B as shown in FIG. 2) flows from the power input part 18 to the welding portion 27 at the second section 26, and thereafter divides into the current A and the current B. By providing the weld portions 27 at two positions, the first busbar component 15 and the second busbar component 16 are connected in parallel with each other, so that resistance of the two weld portions 27 can be lowered. By virtue of this, a larger current can flow in the busbar 12, which is described more in detail in the following paragraphs with reference to FIG. 3.

Figure 3A:
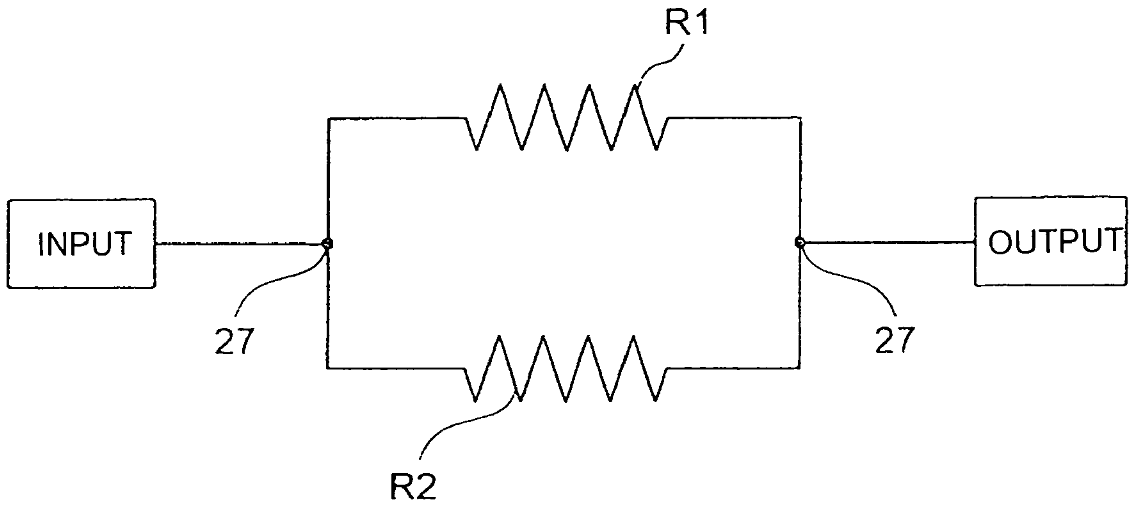
FIG. 3A illustrates parallel connection in the busbar of FIG. 1.

Referring now to FIG. 3, there is shown parallel connection in the busbar 12 having the above-described configuration.

In FIG. 3, points represent the two weld portions 27, respectively. A resistor R1 represents resistance of the first busbar component 15 (for example, R1 may be 10Ω). A resistor R2 represents resistance of the second busbar component 16 (for example, R2 may be 5Ω).

If a current flows from the INPUT box to the OUTPUT box in FIG. 3, combined resistance between the weld portions 27 will be 3.3Ω (combined resistance=R1*R2/(R1+R2)=3.3Ω).

Figure 3B:
FIG. 3B PRIOR ART
FIG. 3B illustrates a comparative example with regard to the parallel connection of FIG. 3A

As a comparative example, FIG. 3B illustrates a conventional case where no weld portions are provided. In this conventional case, the resistance is only represented by R1, and the resistance will be 10Ω. Accordingly, the present invention, when compared with the comparative example, has resistance which is approximately a third of the conventional case. Such reduced resistance contributes to reduction of heating of the busbar 12.

Figure 5:
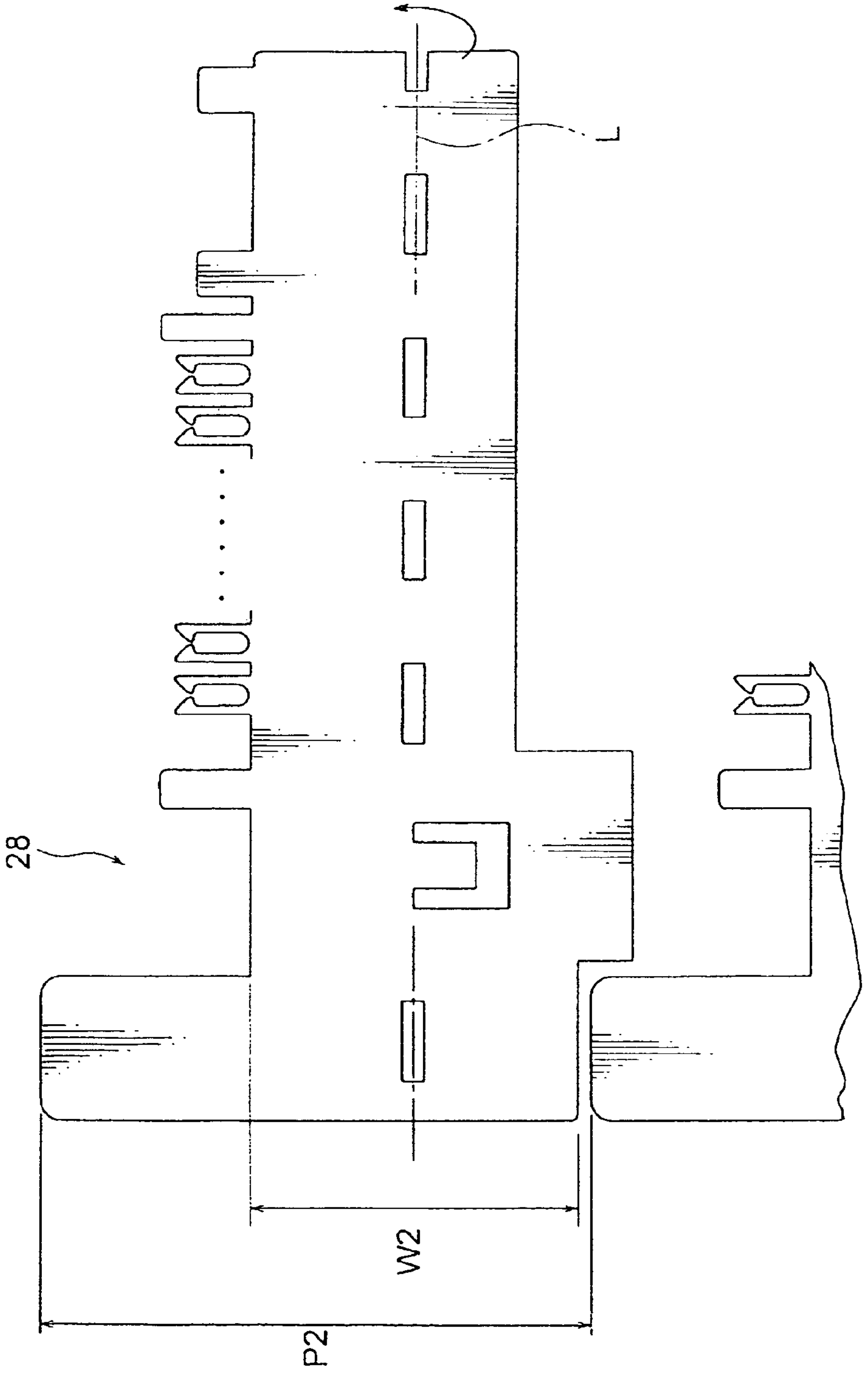
FIG. 5 PRIOR ART
FIG. 5 illustrates a comparative example of a state of blank of the busbar.

Referring to FIG. 4, there is shown a state of blank of the first busbar component 15. Also, FIG. 5 illustrates a state of blank of a busbar 28 as a comparative example. The first busbar component 15 in the state of blank of FIG. 4 allows the large current to flow by virtue of the connection of the second busbar component 16 to the first busbar component 15, and thus the busbar width W1 can be reduced. Also, by virtue of the reduced busbar width W1, a pitch width P1 can also be reduced.

When the busbar 28 of the comparative example of FIG. 5 is used to allow the same large current flow without providing the second busbar component 16 connected thereto, the busbar width W2 becomes large, and the pitch width P2 also large. Further, in order to reduce the busbar width W2, it is necessary to be bent along a line L in FIG. 5. In addition, the busbar 28 of FIG. 5 needs more amount of material and the product will be heavier, and the manufacturing costs will also rise (in contrast, the first busbar component 15 contributes to reducing the amount of material used, product weight, and manufacturing costs).

The present invention, which has been described in the foregoing exemplary embodiments with reference to FIGS. 1 to 5, has the following advantages (by way of illustration and not limited to the described ones).

The second busbar component 16 having superior electric conductivity is connected to a portion of the busbar circuit where the largest current flows (e.g., a portion closest to the power input part 18). Accordingly, the same large current as in the conventional wide busbar (i.e., the busbar 28) can flow in the busbar of the present invention even when the busbar width W1 of the busbar body, i.e., the first busbar component 15 is reduced (for the resistance can be made equal to that in the conventional wide busbar).

The present invention only needs to weld the second busbar component 16 at a necessary portion and to a necessary degree (in this embodiment, busbar welding is not provided at a portion where the current B flows, since after the output of the current A flowing in the busbar 12, the value of the current that flows will become smaller).

Figure 6:
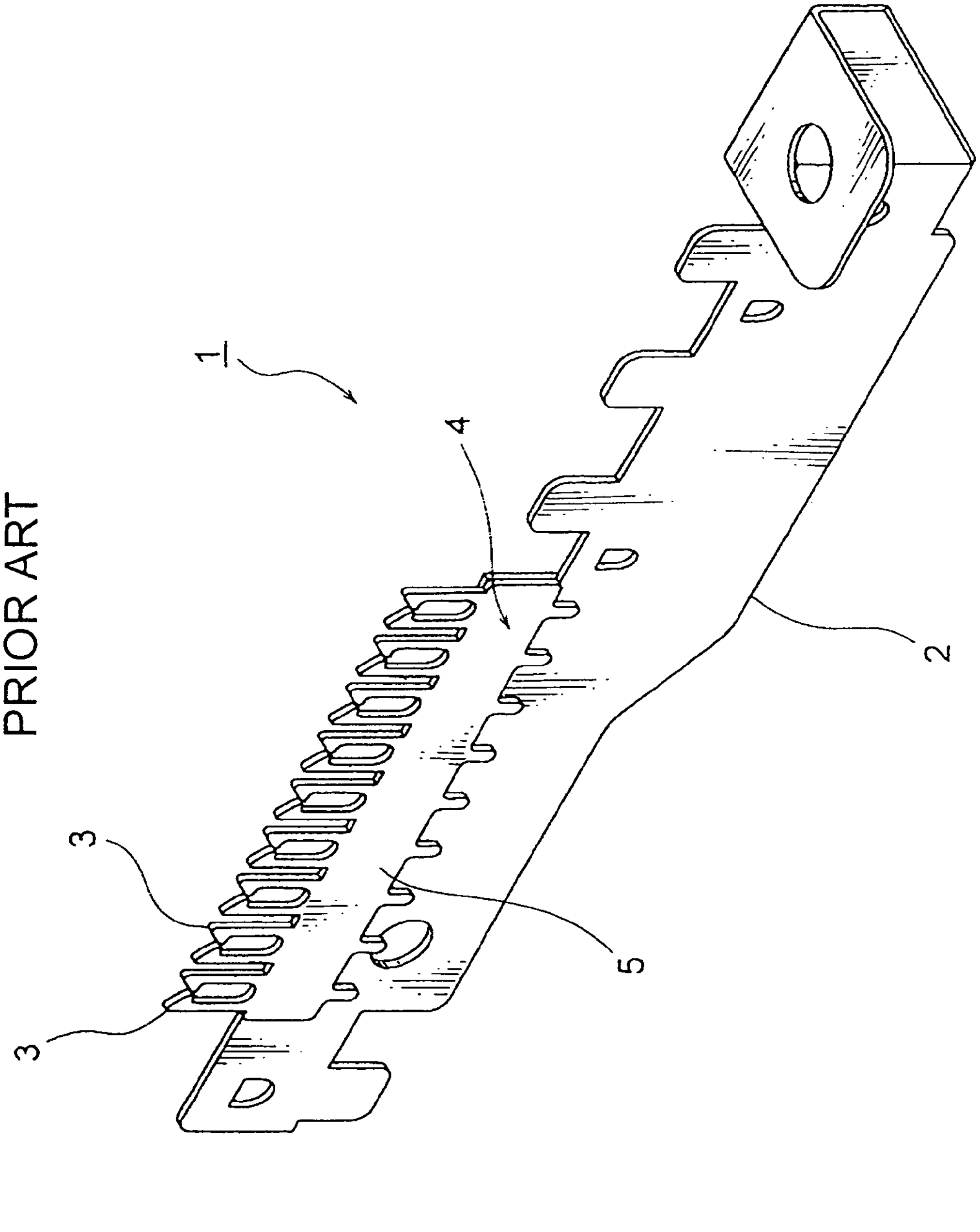
FIG. 6 PRIOR ART
FIG. 6 is a perspective view of a conventional busbar.

The male-terminal-connecting portions 14 of the present invention are provided not in the second busbar component 16 but in the busbar body, i.e., the first busbar component 15. Accordingly, in contrast to the conventional example of FIG. 6, the male-terminal-connecting portions 14 can be stably positioned.

Also, the force acting upon the male-terminal-connecting portion 14 does not affect the welded portion between the first busbar component 15 and the second busbar component 16.

Further, since the width W1 of the busbar 12 of the present invention is reduced, it is made possible to reduce the height of the cavity 13 provided in the junction box body 11 of the electrical junction box to which the busbar 12 is mounted.

Also, since the present invention reduces the height of the cavity wall, the cavity wall does not interfere with mounting operation of the busbar 12, and accordingly it is possible to readily attach (insert) the other terminal fittings in the electrical junction box. Such improvement of insertion of the terminal fittings will lead to prevention of incomplete insertion of the terminals and detachment thereof from the junction box, and thus the workability can be further improved.

While the exemplary embodiment of the present invention has been described by way of example, it will be appreciated by those skilled in the art may make various modifications in the light of the above teaching and within the scope and sprit of the present invention. The scope of the invention is to be defined by the claims appended hereto.

What is claimed is:

1. A busbar comprising:

(a) a first busbar component serving as a busbar body and made of an electrically-conductive metal material having good spring property, the first busbar component including at least one male-terminal-connecting portion adapted to clamp a male terminal of a device connected to the first busbar component, and a power input part provided upstream of the male-terminal-connecting portion; and (b) a second busbar component made of an electrically-conductive metal material having electrical conductivity superior to that of the first busbar component, the second busbar component being connected to the first busbar component via a first section of the second busbar component in register with the power input part of the first busbar component and a second section of the second busbar component in register with a portion of the first busbar component, the portion of the first busbar component being upstream of the male-terminal-connecting portion, wherein the current flowing in the first busbar component is divided at the portion of the first busbar component.

2. The busbar as set forth in claim 1, wherein the second busbar component is connected to the first busbar component by welding, the welding being made at the first section and the second section.

3. An electrical junction box comprising: the busbar of claim 1; and a cavity having an insertion slot into which the busbar is inserted.

4. An electrical junction box comprising: the busbar of claim 2; and a cavity having an insertion slot into which the busbar is inserted.

* * * * *